US009569911B2

(12) United States Patent
Kuehnrich et al.

(10) Patent No.: US 9,569,911 B2
(45) Date of Patent: Feb. 14, 2017

(54) SECONDARY MEDIA RETURN SYSTEM AND METHOD

(75) Inventors: Franz Kuehnrich, Bartlett, IL (US); Jonathan Palmer, Chicago, IL (US); Dan Leiwe, West Palm Beach, FL (US); William Martinka, Chicago, IL (US); Jim Polubinski, Palos Hills, IL (US)

(73) Assignee: REDBOX AUTOMATED RETAIL, LLC, Oakbrook Terrace, IL (US)

( * ) Notice: Subject to any disclaimer, the term of this patent is extended or adjusted under 35 U.S.C. 154(b) by 0 days.

(21) Appl. No.: 12/861,689

(22) Filed: Aug. 23, 2010

(65) Prior Publication Data

US 2012/0046786 A1 Feb. 23, 2012

(51) Int. Cl.

| | |
|---|---|
| ***G06F 17/00*** | (2006.01) |
| ***B65G 57/00*** | (2006.01) |
| ***G07F 7/06*** | (2006.01) |
| *G07F 17/00* | (2006.01) |

(52) U.S. Cl.

CPC ............ *G07F 7/069* (2013.01); *G07F 17/005* (2013.01)

(58) Field of Classification Search

CPC .............................. G07F 17/005; G07F 7/069

USPC ................................................ 700/232, 236

See application file for complete search history.

(56) References Cited

U.S. PATENT DOCUMENTS

| | | | |
|---|---|---|---|
| 2,098,697 | A | 11/1937 | Vanderput |
| 3,267,436 | A | 8/1966 | Alpert et al. |
| 3,379,295 | A | 4/1968 | Varley |
| 3,529,155 | A | 9/1970 | Hansen |
| 3,622,995 | A | 11/1971 | Dilks et al. |
| 3,648,241 | A | 3/1972 | Naito et al. |
| 3,824,544 | A | 7/1974 | Simjian |
| 3,826,344 | A | 7/1974 | Wahlberg |
| 3,831,807 | A | 8/1974 | Deaton et al. |
| 3,946,220 | A | 3/1976 | Brobeck et al. |
| 3,964,577 | A | 6/1976 | Bengtsson |

(Continued)

FOREIGN PATENT DOCUMENTS

| | | |
|---|---|---|
| CA | 2302753 | 5/1999 |
| CA | 1236546 | 1/2000 |

(Continued)

OTHER PUBLICATIONS

Patent Cooperation Treaty International Search Report for Application PCT/US2005/12563 mailed Aug. 10, 2005.

(Continued)

*Primary Examiner* — Michael K Collins

(74) *Attorney, Agent, or Firm* — James P. Muraff; Neal, Gerber & Eisenberg LLP

(57) ABSTRACT

A method for facilitating a rapid return of a article to an article dispensing machine is provided. The article dispensing machine comprises a first user interface portion having the first user interface, a second user interface portion having a second user interface, and an article transfer portion for vending and returning articles. The method includes receiving from a first user interface a first request to return the article, determining whether the article transfer portion is available to enable the return of the article, and based on the availability determination, displaying through a first user interface screen associated with the first user interface portion information indicating whether to proceed with the return of the article or to wait for a notification to proceed with the return.

10 Claims, 9 Drawing Sheets

(56) References Cited

U.S. PATENT DOCUMENTS

| | | | | |
|---|---|---|---|---|
| 4,043,483 | A | | 8/1977 | Gore et al. |
| 4,073,368 | A | | 2/1978 | Mustapick |
| 4,300,040 | A | | 11/1981 | Gould et al. |
| 4,306,219 | A | | 12/1981 | Main et al. |
| 4,348,551 | A | | 9/1982 | Nakatani et al. |
| 4,369,422 | A | | 1/1983 | Rasmussen et al. |
| 4,369,442 | A | | 1/1983 | Werth et al. |
| 4,385,366 | A | | 5/1983 | Housey, Jr. |
| 4,388,689 | A | | 6/1983 | Hayman et al. |
| 4,396,985 | A | | 8/1983 | Ohara et al. |
| 4,414,467 | A | | 11/1983 | Gould et al. |
| 4,415,065 | A | | 11/1983 | Sandstedt et al. |
| 4,449,186 | A | | 5/1984 | Kelly et al. |
| 4,458,802 | A | | 7/1984 | Maciver et al. |
| 4,519,522 | A | | 5/1985 | McElwee |
| 4,530,067 | A | | 7/1985 | Dorr et al. |
| 4,547,851 | A | | 10/1985 | Kurland et al. |
| 4,553,222 | A | | 11/1985 | Kurland et al. |
| 4,567,359 | A | | 1/1986 | Lockwood et al. |
| 4,569,421 | A | | 2/1986 | Sandstedt |
| RE32,115 | E | | 4/1986 | Lockwood et al. |
| 4,598,810 | A | | 7/1986 | Shore et al. |
| 4,649,481 | A | | 3/1987 | Takahashi et al. |
| 4,650,977 | A | | 3/1987 | Couch et al. |
| 4,668,150 | A | | 5/1987 | Blumberg |
| 4,669,596 | A | | 6/1987 | Capers et al. |
| 4,675,515 | A | | 6/1987 | Lucero et al. |
| 4,706,794 | A | | 11/1987 | Awane et al. |
| 4,722,053 | A | | 1/1988 | Dubno et al. |
| 4,723,212 | A | | 2/1988 | Mindrum et al. |
| 4,734,005 | A | | 3/1988 | Blumberg |
| 4,766,548 | A | | 8/1988 | Cedrone et al. |
| 4,767,917 | A | | 8/1988 | Ushikubo et al. |
| 4,775,935 | A | | 10/1988 | Yourick |
| 4,778,983 | A | | 10/1988 | Ushikubo et al. |
| 4,789,045 | A | | 12/1988 | Pugh et al. |
| 4,789,054 | A | | 12/1988 | Shore et al. |
| 4,797,818 | A | | 1/1989 | Cotter |
| 4,812,629 | A | | 3/1989 | O'Neil et al. |
| 4,812,985 | A | | 3/1989 | Hambrick et al. |
| 4,814,592 | A | | 3/1989 | Bradt et al. |
| 4,814,985 | A | | 3/1989 | Swistak et al. |
| 4,821,917 | A | | 4/1989 | Brown |
| 4,825,045 | A | | 4/1989 | Humble et al. |
| 4,839,505 | A | | 6/1989 | Bradt et al. |
| 4,839,507 | A | | 6/1989 | May |
| 4,847,764 | A | | 7/1989 | Halvorson |
| 4,858,743 | A | | 8/1989 | Paraskevakos et al. |
| 4,860,876 | A | | 8/1989 | Moore et al. |
| 4,866,661 | A | | 9/1989 | De Prins et al. |
| 4,882,475 | A | | 11/1989 | Miller et al. |
| 4,893,705 | A | | 1/1990 | Brown |
| 4,893,727 | A | | 1/1990 | Near |
| 4,896,024 | A | * | 1/1990 | Morello .................. G07F 7/069 194/210 |
| 4,903,815 | A | | 2/1990 | Hirschfeld et al. |
| 4,915,205 | A | | 4/1990 | Reid et al. |
| D308,052 | S | | 5/1990 | Darden et al. |
| 4,941,841 | A | | 7/1990 | Darden et al. |
| 4,945,428 | A | | 7/1990 | Waldo et al. |
| 4,947,028 | A | | 8/1990 | Gorog |
| 4,959,686 | A | | 9/1990 | Spallone et al. |
| 4,967,403 | A | | 10/1990 | Ogawa et al. |
| 4,967,906 | A | | 11/1990 | Morello et al. |
| 4,982,346 | A | | 1/1991 | Girouard et al. |
| 4,991,739 | A | | 2/1991 | Levasseur |
| 4,995,498 | A | | 2/1991 | Menke |
| 5,007,518 | A | | 4/1991 | Crooks et al. |
| 5,012,077 | A | | 4/1991 | Takano et al. |
| 5,013,897 | A | | 5/1991 | Harman et al. |
| 5,019,699 | A | | 5/1991 | Koenck et al. |
| 5,020,958 | A | | 6/1991 | Tuttobene et al. |
| 5,028,766 | A | | 7/1991 | Shah et al. |
| 5,042,686 | A | * | 8/1991 | Stucki ............................ 221/13 |
| 5,077,462 | A | | 12/1991 | Newell et al. |
| 5,077,607 | A | | 12/1991 | Johnson et al. |
| 5,085,308 | A | | 2/1992 | Wilhelm |
| 5,088,586 | A | | 2/1992 | Isobe et al. |
| 5,091,713 | A | | 2/1992 | Horne et al. |
| 5,095,195 | A | | 3/1992 | Harman et al. |
| 5,105,069 | A | | 4/1992 | Hakenewerth et al. |
| 5,128,862 | A | | 7/1992 | Mueller et al. |
| 5,133,441 | A | | 7/1992 | Brown |
| 5,139,384 | A | | 8/1992 | Tuttobene et al. |
| 5,143,193 | A | | 9/1992 | Geraci |
| 5,159,560 | A | | 10/1992 | Newell et al. |
| 5,205,436 | A | * | 4/1993 | Savage ............................ 221/7 |
| 5,206,814 | A | | 4/1993 | Cahlander et al. |
| 5,207,784 | A | | 5/1993 | Schwartzendruber et al. |
| 5,212,649 | A | | 5/1993 | Pelletier et al. |
| 5,235,509 | A | | 8/1993 | Mueller et al. |
| RE34,369 | E | | 9/1993 | Darden et al. |
| 5,273,183 | A | * | 12/1993 | Tuttobene ......................... 221/7 |
| 5,313,392 | A | | 5/1994 | Temma et al. |
| 5,313,393 | A | | 5/1994 | Varley et al. |
| 5,319,705 | A | | 6/1994 | Halter |
| 5,323,327 | A | | 6/1994 | Carmichael et al. |
| 5,353,219 | A | | 10/1994 | Mueller et al. |
| 5,383,111 | A | | 1/1995 | Homma et al. |
| 5,385,265 | A | | 1/1995 | Schlamp et al. |
| 5,408,417 | A | | 4/1995 | Wilder |
| 5,409,092 | A | | 4/1995 | Itako et al. |
| 5,418,713 | A | | 5/1995 | Allen et al. |
| 5,442,568 | A | | 8/1995 | Ostendorf et al. |
| 5,445,295 | A | | 8/1995 | Brown et al. |
| 5,450,584 | A | | 9/1995 | Sekiguchi et al. |
| 5,450,938 | A | | 9/1995 | Rademacher et al. |
| 5,467,892 | A | | 11/1995 | Schlamp et al. |
| 5,482,139 | A | | 1/1996 | Rivalto et al. |
| 5,484,988 | A | | 1/1996 | Hills et al. |
| 5,499,707 | A | | 3/1996 | Steury |
| 5,504,675 | A | | 4/1996 | Cragun et al. |
| 5,510,979 | A | | 4/1996 | Moderi et al. |
| 5,513,116 | A | | 4/1996 | Buckley et al. |
| 5,546,316 | A | | 8/1996 | Buckley et al. |
| 5,550,746 | A | | 8/1996 | Jacobs |
| 5,555,143 | A | | 9/1996 | Hinnen et al. |
| 5,559,714 | A | | 9/1996 | Banks et al. |
| 5,561,604 | A | | 10/1996 | Buckley et al. |
| 5,576,951 | A | | 11/1996 | Lockwood |
| 5,594,791 | A | | 1/1997 | Szlam et al. |
| 5,615,123 | A | | 3/1997 | Davidson et al. |
| 5,632,681 | A | | 5/1997 | Bakoglu et al. |
| 5,633,839 | A | | 5/1997 | Alexander et al. |
| 5,637,845 | A | | 6/1997 | Kolls et al. |
| 5,644,727 | A | | 7/1997 | Atkins |
| 5,647,505 | A | | 7/1997 | Scott |
| 5,647,507 | A | | 7/1997 | Kasper |
| 5,682,276 | A | | 10/1997 | Hinnen et al. |
| 5,694,546 | A | | 12/1997 | Reisman |
| 5,699,262 | A | | 12/1997 | Lang et al. |
| 5,699,528 | A | | 12/1997 | Hogan et al. |
| 5,715,403 | A | | 2/1998 | Stefik et al. |
| 5,724,069 | A | | 3/1998 | Chen et al. |
| 5,724,521 | A | | 3/1998 | Dedrick et al. |
| 5,732,398 | A | | 3/1998 | Tagawa et al. |
| 5,734,150 | A | | 3/1998 | Brown et al. |
| 5,748,485 | A | | 5/1998 | Christiansen et al. |
| 5,754,850 | A | | 5/1998 | Janssen |
| 5,761,071 | A | | 6/1998 | Bernstein et al. |
| 5,765,142 | A | | 6/1998 | Allred et al. |
| 5,768,142 | A | | 6/1998 | Jacobs et al. |
| 5,769,269 | A | | 6/1998 | Peters et al. |
| 5,777,884 | A | | 7/1998 | Belka et al. |
| 5,790,677 | A | | 8/1998 | Fox et al. |
| 5,806,071 | A | | 9/1998 | Balderrama et al. |
| 5,822,216 | A | | 10/1998 | Satchell et al. |
| 5,822,291 | A | | 10/1998 | Brindze et al. |
| 5,831,862 | A | | 11/1998 | Hetrick et al. |
| 5,832,503 | A | | 11/1998 | Malik et al. |
| 5,850,442 | A | | 12/1998 | Muftic et al. |
| 5,870,716 | A | | 2/1999 | Sugiyama et al. |
| 5,873,069 | A | | 2/1999 | Reuhl et al. |
| 5,875,110 | A | | 2/1999 | Jacobs |

(56) References Cited

U.S. PATENT DOCUMENTS 5,884,278 A 3/1999 Powell et al.
5,898,594 A 4/1999 Leason et al.
5,900,608 A 5/1999 Iida et al.
5,905,246 A 5/1999 Fajkowski
5,923,016 A 7/1999 Fredregill et al.
5,930,771 A 7/1999 Stapp et al.
5,934,439 A 8/1999 Kanoh et al.
5,936,452 A 8/1999 Utsuno et al.
5,938,510 A 8/1999 Takahashi et al.
5,941,363 A 8/1999 Partyka et al.
5,943,423 A 8/1999 Muftic et al.
5,950,173 A 9/1999 Perkowski et al.
5,954,797 A 9/1999 Sidey et al.
5,956,694 A 9/1999 Powell et al.
5,959,869 A 9/1999 Miller et al.
5,963,134 A 10/1999 Bowers et al.
5,963,452 A 10/1999 Etoh et al.
5,984,509 A 11/1999 Scott et al.
5,988,346 A 11/1999 Tedesco et al.
5,988,431 A 11/1999 Roe
5,997,170 A 12/1999 Brodbeck et al.
6,002,395 A 12/1999 Wagner et al.
6,014,137 A 1/2000 Burns et al.
6,029,851 A 2/2000 Jenkins et al.
6,039,244 A 3/2000 Finsterwald
6,044,362 A 3/2000 Neely et al.
6,047,338 A 4/2000 Grolemund et al.
6,050,448 A 4/2000 Willis
6,056,194 A 5/2000 Kolls et al.
6,058,373 A 5/2000 Blinn et al.
6,061,660 A 5/2000 Eggleston et al.
6,062,478 A 5/2000 Izaguirre et al.
6,072,481 A 6/2000 Matsushita et al.
6,076,101 A 6/2000 Kamakura et al.
6,078,848 A 6/2000 Bernstein et al.
6,085,888 A 7/2000 Tedesco et al.
6,101,483 A 8/2000 Petrovich et al.
6,109,524 A 8/2000 Kanoh et al.
6,115,649 A 9/2000 Sakata et al.
6,119,934 A 9/2000 Kolls et al.
6,123,223 A 9/2000 Watkins
6,125,353 A 9/2000 Yagasaki
6,126,036 A 10/2000 d' Alayer de Costemore d'Arc et al.
6,134,547 A 10/2000 Huxley et al.
6,138,911 A 10/2000 Fredregill et al.
6,161,059 A 12/2000 Tedesco et al.
6,164,528 A 12/2000 Hills et al.
6,169,483 B1 1/2001 Ghaffari et al.
6,179,206 B1 1/2001 Matsumori
6,181,981 B1 1/2001 Varga et al.
6,182,857 B1 2/2001 Hamm et al.
6,195,661 B1 2/2001 Filepp et al.
6,199,141 B1 3/2001 Weinreb et al.
6,199,720 B1 3/2001 Rudick et al.
6,201,474 B1 * 3/2001 Brady et al. ............... 340/572.8
6,202,006 B1 3/2001 Scott
6,209,322 B1 4/2001 Yoshida et al.
6,243,687 B1 6/2001 Powell
6,250,452 B1 6/2001 Partyka et al.
6,264,104 B1 7/2001 Jenkins et al.
6,269,285 B1 7/2001 Mignault
6,286,139 B1 9/2001 Decinque
6,289,322 B1 9/2001 Kitchen et al.
6,295,482 B1 9/2001 Tognazzini
6,298,972 B1 10/2001 Tedesco et al.
6,311,165 B1 10/2001 Coutts et al.
6,317,649 B1 11/2001 Tedesco et al.
6,321,985 B1 11/2001 Kolls
6,324,520 B1 11/2001 Walker et al.
6,327,230 B1 12/2001 Miller et al.
6,330,958 B1 12/2001 Ruskin et al.
6,334,110 B1 12/2001 Walter et al.
6,336,098 B1 1/2002 Fortenberry et al.
6,354,501 B1 3/2002 Outwater et al.
6,360,139 B1 3/2002 Jacobs
6,366,914 B1 4/2002 Stern
6,367,653 B1 4/2002 Ruskin et al.
6,367,696 B1 4/2002 Inamitsu et al.
6,397,126 B1 5/2002 Nelson
6,397,199 B1 5/2002 Goodwin, III
6,412,654 B1 7/2002 Cleeve
6,415,555 B1 7/2002 Montague
6,415,950 B1 7/2002 Robrechts
6,416,270 B1 7/2002 Steury et al.
6,424,706 B1 7/2002 Katz et al.
6,430,470 B1 8/2002 Nakajima et al.
6,435,406 B1 8/2002 Pentel
6,456,981 B1 9/2002 Dejaeger et al.
6,457,038 B1 9/2002 Defosse
6,462,644 B1 10/2002 Howell et al.
6,466,658 B2 10/2002 Schelberg, Jr. et al.
6,466,830 B1 10/2002 Manross
6,477,503 B1 11/2002 Mankes
6,490,502 B2 12/2002 Fellows et al.
6,493,110 B1 12/2002 Roberts
6,522,772 B1 2/2003 Morrison et al.
6,527,176 B2 3/2003 Baric
6,539,282 B2 3/2003 Metcalf et al.
6,540,100 B2 4/2003 Credle, Jr. et al.
6,575,363 B1 6/2003 Leason et al.
6,584,309 B1 6/2003 Whigham
6,584,450 B1 * 6/2003 Hastings et al. ............. 705/26.1
6,584,564 B2 6/2003 Olkin et al.
6,587,748 B2 7/2003 Baack
6,587,835 B1 7/2003 Treyz et al.
6,595,342 B1 7/2003 Maritzen et al.
6,606,602 B1 8/2003 Kolls
6,628,764 B1 9/2003 Petite
6,640,159 B2 10/2003 Holmes et al.
6,644,455 B2 11/2003 Ichikawa
6,644,495 B2 11/2003 Ruskin et al.
6,655,580 B1 12/2003 Ergo et al.
6,658,323 B2 12/2003 Tedesco et al.
6,688,523 B1 2/2004 Koenck
6,696,918 B2 2/2004 Kucharczyk et al.
6,707,380 B2 3/2004 Maloney
6,707,381 B1 3/2004 Maloney
6,708,879 B2 3/2004 Hunt
6,711,464 B1 3/2004 Yap et al.
6,711,465 B2 3/2004 Tomassi
6,715,403 B2 4/2004 Hajek, Jr. et al.
6,728,532 B1 4/2004 Ahonen
6,742,673 B2 6/2004 Credle, Jr. et al.
6,748,296 B2 6/2004 Banerjee et al.
6,748,539 B1 6/2004 Lotspiech
6,754,559 B2 6/2004 Itako
6,757,585 B2 6/2004 Ohtsuki et al.
6,792,334 B2 9/2004 Metcalf et al.
6,794,634 B2 9/2004 Hair
6,814,256 B2 11/2004 Clark
6,842,115 B1 * 1/2005 Harris .................... G06Q 20/20 235/381
6,847,861 B2 1/2005 Lunak et al.
6,850,816 B2 2/2005 Garratt
6,851,092 B2 2/2005 Chang et al.
6,854,642 B2 2/2005 Metcalf et al.
6,923,371 B2 8/2005 Goodfellow
6,932,270 B1 8/2005 Fajkowski
6,954,732 B1 10/2005 DeLapa et al.
6,959,285 B2 10/2005 Stefanik et al.
6,959,286 B2 10/2005 Perkowski
6,965,869 B1 11/2005 Tomita et al.
6,968,365 B2 11/2005 Hollström et al.
6,970,837 B1 11/2005 Walker et al.
6,980,887 B2 12/2005 Varga et al.
6,985,607 B2 1/2006 Alasia et al.
7,024,381 B1 4/2006 Hastings et al.
7,024,390 B1 4/2006 Mori et al.
7,043,497 B1 5/2006 Carty et al.
7,053,773 B2 5/2006 McGarry et al.
7,058,581 B1 6/2006 Young
7,076,329 B1 7/2006 Kolls
7,079,230 B1 7/2006 McInerney et al.

(56) References Cited

U.S. PATENT DOCUMENTS 7,079,822 B2 7/2006 Gunji et al.
7,079,922 B2 7/2006 Komai
7,085,556 B2 8/2006 Offer
7,085,727 B2 8/2006 VanOrman
7,108,180 B2 9/2006 Brusso et al.
7,139,731 B1 11/2006 Alvin
7,167,842 B1 1/2007 Josephson, II et al.
7,167,892 B2 1/2007 Defossé et al.
7,174,317 B2 2/2007 Phillips et al.
7,191,952 B2 3/2007 Blossom
7,203,675 B1 4/2007 Papierniak et al.
7,209,893 B2 4/2007 Nii
7,233,916 B2 6/2007 Schultz
7,234,609 B2 6/2007 DeLazzer et al.
7,236,946 B2 6/2007 Bates et al.
7,240,805 B2 7/2007 Chirnomas
7,240,843 B2 7/2007 Paul et al.
7,310,612 B2 12/2007 McQueen, III et al.
7,315,629 B2 1/2008 Alasia et al.
7,347,359 B2 3/2008 Boyes et al.
7,350,230 B2 3/2008 Forrest
7,366,586 B2 4/2008 Kaplan et al.
7,389,243 B2 6/2008 Gross
7,406,693 B1 7/2008 Goodwin, III
7,412,073 B2 8/2008 Alasia et al.
7,444,296 B1 * 10/2008 Barber ................. G06Q 10/087 194/205
7,447,605 B2 11/2008 Kuehnrich
7,499,768 B2 3/2009 Hoersten et al.
7,584,869 B2 9/2009 DeLazzer et al.
7,747,346 B2 6/2010 Lowe et al.
7,774,233 B2 8/2010 Barber et al.
7,787,987 B2 8/2010 Kuehnrich et al.
7,797,077 B2 9/2010 Hale
7,853,354 B2 12/2010 Kuehnrich et al.
7,853,600 B2 12/2010 Herz et al.
7,860,606 B2 * 12/2010 Rudy ................... G11B 17/225 700/232
7,988,049 B2 8/2011 Kuehnrich
8,036,774 B2 * 10/2011 Blust ...................... G06Q 10/08 700/232
8,041,454 B2 * 10/2011 Blust .................... G06Q 10/087 700/232
8,060,249 B2 11/2011 Bear et al.
8,078,316 B2 * 12/2011 Blust .................... G06Q 10/087 700/232
8,086,349 B2 * 12/2011 Blust .................... G06Q 10/087 700/231
8,095,236 B2 * 1/2012 Rudy ...................... G07F 7/069 700/231
8,235,247 B2 8/2012 Alvarez
8,352,449 B1 1/2013 Parekh et al.
8,369,987 B2 * 2/2013 Claessen .............. G06Q 20/123 700/232
8,386,347 B2 * 2/2013 Hoblit ............................. 705/35
8,463,432 B2 * 6/2013 Weinshenker ................ 700/242
2001/0011252 A1 8/2001 Kasahara
2001/0011680 A1 8/2001 Soltesz et al.
2001/0027357 A1 10/2001 Grobler
2001/0035425 A1 11/2001 Rocco et al.
2001/0037207 A1 11/2001 Dejaeger
2001/0047223 A1 11/2001 Metcalf et al.
2002/0029196 A1 3/2002 Metcalf et al.
2002/0046122 A1 4/2002 Barber et al.
2002/0046123 A1 4/2002 Nicolini
2002/0065579 A1 5/2002 Tedesco et al.
2002/0074397 A1 6/2002 Matthews
2002/0082917 A1 * 6/2002 Takano ........................... 705/14
2002/0084322 A1 7/2002 Baric
2002/0087334 A1 7/2002 Yamaguchi et al.
2002/0095680 A1 7/2002 Davidson
2002/0125314 A1 9/2002 Jenkins et al.
2002/0133269 A1 9/2002 Anselmi
2002/0161475 A1 10/2002 Varga et al.
2002/0165787 A1 11/2002 Bates et al.
2002/0165788 A1 11/2002 Bates et al.
2002/0165821 A1 11/2002 Tree
2002/0169715 A1 11/2002 Ruth et al.
2002/0183882 A1 12/2002 Dearing et al.
2002/0195491 A1 12/2002 Bunch, III
2003/0004828 A1 1/2003 Epstein
2003/0009408 A1 1/2003 Korin
2003/0023453 A1 1/2003 Hafen et al.
2003/0033054 A1 2/2003 Yamazaki
2003/0057219 A1 3/2003 Risolia
2003/0061094 A1 3/2003 Banerjee et al.
2003/0105554 A1 6/2003 Eggenberger et al.
2003/0125961 A1 7/2003 Janda
2003/0130762 A1 7/2003 Tomassi
2003/0149510 A1 8/2003 Takahashi
2003/0163382 A1 8/2003 Stefanik et al.
2003/0163399 A1 8/2003 Harper et al.
2003/0167231 A1 9/2003 Winking et al.
2003/0212471 A1 11/2003 Chakravarti
2004/0006537 A1 1/2004 Zelechoski et al.
2004/0010340 A1 1/2004 Guindulain Vidondo
2004/0016620 A1 1/2004 Davis
2004/0030446 A1 2/2004 Guindulain Vidondo
2004/0050648 A1 3/2004 Carapelli
2004/0064377 A1 4/2004 Ergo et al.
2004/0065579 A1 4/2004 Wood
2004/0068346 A1 4/2004 Boucher
2004/0068451 A1 4/2004 Lenk et al.
2004/0078328 A1 4/2004 Talbert et al.
2004/0079798 A1 4/2004 Messenger et al.
2004/0133466 A1 7/2004 Redmond et al.
2004/0133653 A1 7/2004 Defosse et al.
2004/0153413 A1 8/2004 Gross
2004/0158503 A1 8/2004 Gross
2004/0158504 A1 8/2004 Gross
2004/0158871 A1 8/2004 Jacobson
2004/0162633 A1 8/2004 Kraft
2004/0162783 A1 8/2004 Gross
2004/0172274 A1 9/2004 Gross
2004/0172275 A1 9/2004 Gross
2004/0172342 A1 9/2004 Gross
2004/0243479 A1 12/2004 Gross
2004/0243480 A1 12/2004 Gross
2004/0249711 A1 12/2004 Walker et al.
2004/0254676 A1 * 12/2004 Blust .................... G06Q 10/087 700/231
2004/0256402 A1 12/2004 Chirnomas
2004/0260600 A1 12/2004 Gross
2004/0267604 A1 12/2004 Gross
2004/0267640 A1 12/2004 Bong et al.
2005/0022239 A1 1/2005 Meuleman
2005/0027648 A1 2/2005 Knowles et al.
2005/0033855 A1 2/2005 Moradi et al.
2005/0060062 A1 3/2005 Walker et al.
2005/0060246 A1 3/2005 Lastinger et al.
2005/0080510 A1 4/2005 Bates et al.
2005/0085946 A1 4/2005 Visikivi et al.
2005/0086127 A1 4/2005 Hastings et al.
2005/0091069 A1 4/2005 Chuang
2005/0096936 A1 5/2005 Lambers
2005/0109836 A1 5/2005 Ben-Aissa
2005/0177494 A1 8/2005 Kelly et al.
2005/0197855 A1 9/2005 Nudd
2005/0216120 A1 9/2005 Rosenberg
2005/0230410 A1 10/2005 DeLazzer et al.
2005/0230473 A1 10/2005 Fajkowski
2005/0234911 A1 10/2005 Hess et al.
2005/0261977 A1 11/2005 Kiji et al.
2005/0267819 A1 12/2005 Kaplan
2005/0274793 A1 12/2005 Cantini et al.
2005/0283434 A1 12/2005 Hahn-Carlson et al.
2005/0289032 A1 12/2005 Hoblit
2006/0026031 A1 2/2006 Gentling
2006/0026162 A1 2/2006 Salmonsen
2006/0041508 A1 2/2006 Pham et al.
2006/0074777 A1 4/2006 Anderson
2006/0095286 A1 5/2006 Kimura
2006/0095339 A1 5/2006 Hayashi et al.

(56) References Cited

U.S. PATENT DOCUMENTS

| | | | |
|---|---|---|---|
| 2006/0096997 A1 | 5/2006 | Yeo | |
| 2006/0122881 A1 | 6/2006 | Walker et al. | |
| 2006/0149685 A1 | 7/2006 | Gross | |
| 2006/0155575 A1 | 7/2006 | Gross | |
| 2006/0184395 A1 | 8/2006 | Millwee | |
| 2006/0190345 A1 | 8/2006 | Crowley | |
| 2006/0212360 A1 | 9/2006 | Stefanik et al. | |
| 2006/0212367 A1 | 9/2006 | Gross | |
| 2006/0231612 A1 | 10/2006 | Walker et al. | |
| 2006/0231613 A1 | 10/2006 | Walker et al. | |
| 2006/0231614 A1 | 10/2006 | Walker et al. | |
| 2006/0235746 A1 | 10/2006 | Hammond et al. | |
| 2006/0235747 A1 | 10/2006 | Hammond et al. | |
| 2006/0241966 A1 | 10/2006 | Walker et al. | |
| 2006/0241967 A1 | 10/2006 | Gross | |
| 2006/0242059 A1 | 10/2006 | Hansen | |
| 2006/0247823 A1 | 11/2006 | Boucher | |
| 2006/0247824 A1 | 11/2006 | Walker et al. | |
| 2006/0254832 A1 | 11/2006 | Strong | |
| 2006/0254862 A1 | 11/2006 | Hoersten | |
| 2006/0259190 A1 | 11/2006 | Hale | |
| 2006/0259191 A1 | 11/2006 | Lowe | |
| 2006/0259192 A1* | 11/2006 | Lowe | G06Q 10/06311 700/236 |
| 2006/0265101 A1 | 11/2006 | Kaplan et al. | |
| 2006/0265286 A1 | 11/2006 | Evangelist et al. | |
| 2006/0266823 A1 | 11/2006 | Passen et al. | |
| 2006/0272922 A1 | 12/2006 | Hoersten et al. | |
| 2006/0273152 A1 | 12/2006 | Fields | |
| 2007/0005438 A1 | 1/2007 | Evangelist et al. | |
| 2007/0011093 A1 | 1/2007 | Tree | |
| 2007/0011903 A1 | 1/2007 | Chang | |
| 2007/0050083 A1 | 3/2007 | Signorelli et al. | |
| 2007/0050256 A1 | 3/2007 | Walker et al. | |
| 2007/0050266 A1 | 3/2007 | Barber et al. | |
| 2007/0051802 A1 | 3/2007 | Barber et al. | |
| 2007/0063020 A1 | 3/2007 | Barrafato | |
| 2007/0063027 A1 | 3/2007 | Belfer et al. | |
| 2007/0067429 A1 | 3/2007 | Jain et al. | |
| 2007/0084872 A1 | 4/2007 | Hair et al. | |
| 2007/0084917 A1 | 4/2007 | Fajkowski | |
| 2007/0094245 A1 | 4/2007 | Vigil | |
| 2007/0095901 A1 | 5/2007 | Illingworth | |
| 2007/0125104 A1 | 6/2007 | Ehlers | |
| 2007/0130020 A1 | 6/2007 | Paolini | |
| 2007/0136247 A1 | 6/2007 | Vigil | |
| 2007/0156442 A1 | 7/2007 | Ali | |
| 2007/0156578 A1 | 7/2007 | Perazolo | |
| 2007/0162183 A1 | 7/2007 | Pinney et al. | |
| 2007/0162184 A1 | 7/2007 | Pinney et al. | |
| 2007/0169132 A1* | 7/2007 | Blust | G06Q 10/087 720/600 |
| 2007/0175986 A1 | 8/2007 | Petrone et al. | |
| 2007/0179668 A1 | 8/2007 | Mellin | |
| 2007/0185776 A1 | 8/2007 | Nguyen et al. | |
| 2007/0210153 A1 | 9/2007 | Walker et al. | |
| 2007/0213871 A1 | 9/2007 | Whitten et al. | |
| 2007/0252003 A1 | 11/2007 | Goldring et al. | |
| 2007/0276537 A1 | 11/2007 | Walker et al. | |
| 2008/0005025 A1 | 1/2008 | Legere et al. | |
| 2008/0027835 A1 | 1/2008 | LeMasters et al. | |
| 2008/0040211 A1 | 2/2008 | Walker et al. | |
| 2008/0125906 A1 | 5/2008 | Bates et al. | |
| 2008/0222690 A1 | 9/2008 | Kim | |
| 2008/0239961 A1 | 10/2008 | Hilerio et al. | |
| 2008/0275591 A1 | 11/2008 | Chirnomas | |
| 2009/0018792 A1 | 1/2009 | Kuehnrich | |
| 2009/0030931 A1 | 1/2009 | Khivesara et al. | |
| 2009/0048932 A1 | 2/2009 | Barber | |
| 2009/0089187 A1 | 4/2009 | Hoersten et al. | |
| 2009/0113116 A1 | 4/2009 | Thompson et al. | |
| 2009/0299824 A1 | 12/2009 | Barnes, Jr. | |
| 2009/0326708 A1* | 12/2009 | Rudy | G07F 7/069 700/234 |
| 2010/0010964 A1 | 1/2010 | Skowronek et al. | |
| 2010/0036808 A1 | 2/2010 | Lee | |
| 2010/0042577 A1 | 2/2010 | Rinearson | |
| 2010/0057871 A1 | 3/2010 | Kaplan et al. | |
| 2010/0138037 A1* | 6/2010 | Adelberg et al. | 700/241 |
| 2010/0153983 A1 | 6/2010 | Philmon et al. | |
| 2010/0198400 A1 | 8/2010 | Pascal et al. | |
| 2010/0274624 A1 | 10/2010 | Rochford et al. | |
| 2010/0312380 A1 | 12/2010 | Lowe et al. | |
| 2010/0314405 A1 | 12/2010 | Alvarez | |
| 2010/0318219 A1 | 12/2010 | Kuehnrich et al. | |
| 2011/0004536 A1 | 1/2011 | Hoersten et al. | |
| 2011/0047010 A1 | 2/2011 | Arnold et al. | |
| 2011/0060454 A1 | 3/2011 | Lowe et al. | |
| 2011/0060456 A1 | 3/2011 | Lowe et al. | |
| 2011/0093329 A1 | 4/2011 | Bodor et al. | |
| 2011/0103609 A1 | 5/2011 | Pelland et al. | |
| 2011/0130873 A1* | 6/2011 | Yepez et al. | 700/237 |
| 2011/0131652 A1 | 6/2011 | Robinson et al. | |
| 2011/0145033 A1 | 6/2011 | Kuehnrich et al. | |
| 2011/0153060 A1 | 6/2011 | Yepez et al. | |
| 2011/0153067 A1* | 6/2011 | Weinshenker | 700/232 |
| 2011/0153071 A1* | 6/2011 | Claessen | 700/234 |
| 2011/0238194 A1 | 9/2011 | Rosenberg | |
| 2011/0238296 A1 | 9/2011 | Purks et al. | |
| 2012/0046786 A1* | 2/2012 | Kuehnrich et al. | 700/232 |
| 2012/0311633 A1 | 12/2012 | Mandrekar et al. | |
| 2013/0046707 A1 | 2/2013 | Maskatia et al. | |
| 2013/0060648 A1 | 3/2013 | Maskatia et al. | |
| 2013/0073468 A1 | 3/2013 | Maskatia et al. | |

FOREIGN PATENT DOCUMENTS

| | | |
|---|---|---|
| DE | 35 29 155 | 2/1987 |
| EP | 0060643 | 9/1982 |
| EP | 205691 | 12/1986 |
| EP | 0249367 | 12/1987 |
| EP | 572119 | 12/1993 |
| EP | 287367 | 10/1998 |
| EP | 986033 | 3/2000 |
| EP | 1367549 | 12/2003 |
| EP | 2113892 A1 | 11/2009 |
| FR | 2549624 | 1/1985 |
| FR | 2559599 | 8/1985 |
| FR | 2562293 | 10/1995 |
| GB | 380926 | 9/1932 |
| GB | 2143662 | 2/1985 |
| GB | 2172720 | 9/1986 |
| GB | 2402242 | 12/2004 |
| JP | 55156107 | 12/1980 |
| JP | 56047855 | 4/1981 |
| JP | 02178795 | 7/1990 |
| JP | 03062189 | 3/1991 |
| JP | 03119496 | 5/1991 |
| JP | 10247982 | 9/1998 |
| JP | 00149136 | 3/2000 |
| JP | 03036328 | 2/2003 |
| JP | 04094857 | 3/2004 |
| JP | 09043143 | 2/2009 |
| KR | 1020030089154 | 11/2003 |
| KR | 1020040069053 | 8/2004 |
| KR | 1020060080175 | 7/2006 |
| KR | 1020070021301 | 2/2007 |
| WO | WO 87/00948 | 2/1987 |
| WO | WO 87/05425 | 9/1987 |
| WO | WO 88/04085 | 6/1988 |
| WO | WO 93/00644 | 1/1993 |
| WO | WO 88/06771 | 9/1998 |
| WO | WO 99/24902 | 5/1999 |
| WO | WO 00/38120 | 6/2000 |
| WO | WO 00/72160 | 11/2000 |
| WO | WO 02/29708 | 4/2002 |
| WO | WO 2004/070646 | 8/2004 |
| WO | WO 2005/062887 | 7/2005 |
| WO | WO 2006/112817 | 10/2006 |
| WO | WO 2006/116108 | 11/2006 |
| WO | WO 2006/116109 | 11/2006 |
| WO | WO 2006/116110 | 11/2006 |
| WO | WO 2006/116112 | 11/2006 |
| WO | WO 2006/116113 | 11/2006 |

(56) References Cited

FOREIGN PATENT DOCUMENTS

| | | | |
|---|---|---|---|
| WO | WO 2006/116114 | | 11/2006 |
| WO | WO 2006/116115 | | 11/2006 |
| WO | WO 2006/116116 | | 11/2006 |
| WO | WO 2011/022689 | | 2/2011 |
| WO | WO 2011/028727 | | 3/2011 |
| WO | WO 2011/028728 | | 3/2011 |
| WO | WO 2011/031532 | | 3/2011 |
| WO | 2012174172 | A2 | 12/2012 |

OTHER PUBLICATIONS

International Preliminary Report on Patentability for Application PCT/US2005/12563 dated Apr. 7, 20106.
Patent Cooperation Treaty International Search Report for Application PCT/US2006/15125 mailed Jan. 11, 2007.
International Preliminary Report on Patentability for Application PCT/US2006/15125 dated Jan. 11, 2007.
Patent Cooperation Treaty International Search Report for Application PCT/US2006/15131 mailed Jul. 7, 2008.
International Preliminary Report on Patentability for Application PCT/US2006/15131 dated Jun. 11, 2008.
Patent Cooperation Treaty International Search Report for Application PCT/US06/15130 mailed Nov. 22, 2006.
International Preliminary Report on Patentability for Application PCT/US06/15130 dated Apr. 23, 2007.
Patent Cooperation Treaty International Search Report for Application PCT/US06/15132 mailed May 10, 2007.
International Preliminary Report on Patentability for Application PCT/US06/15132 dated Nov. 17, 2007.
Patent Cooperation Treaty International Search Report for Application PCT/US06/15127 mailed Jun. 19, 2008.
International Preliminary Report on Patentability for Application PCT/US06/15127 dated Mar. 10, 2009.
Patent Cooperation Treaty International Search Report for Application PCT/US06/15129 mailed Sep. 20, 2006.
International Preliminary Report on Patentability for Application PCT/US06/15129 dated Oct. 23, 2007.
Patent Cooperation Treaty International Search Report for Application PCT/US06/15126 mailed Apr. 30, 2008.
International Preliminary Report on Patentability for Application PCT/US06/15126 dated Mar. 10, 2009.
Patent Cooperation Treaty International Search Report for Application PCT/US06/15133 mailed Jun. 6, 2007.
International Preliminary Report on Patentability for Application PCT/US06/15133 dated Oct. 23, 2007.
Patent Cooperation Treaty International Search Report for Application PCT/US2010/046872 mailed Mar. 29, 2011.
International Preliminary Report on Patentability for Application PCT/US2010/046872 dated Sep. 7, 2011.
Patent Cooperation Treaty International Search Report for Application US2010/046219 mailed Feb. 28, 2011.
International Preliminary Report on Patentability for Application US2010/046219 dated Feb. 21, 2012.
Patent Cooperation Treaty International Search Report for Application US2010/047374 mailed May 2, 2011.
International Preliminary Report on Patentability for Application US2010/047374 dated Mar. 6, 2012.
Patent Cooperation Treaty International Search Report for Application US2010/047371 mailed Apr. 29, 2011.
International Preliminary Report on Patentability for Application US2010/047371 dated Mar. 6, 2012.
Patent Cooperation Treaty International Search Report for Application US2012/024900 mailed Oct. 19, 2012.
International Preliminary Report on Patentability for Application US2012/024900 dated Aug. 21, 2013.
Patent Cooperation Treaty International Search Report for Application US2010/050339 mailed Feb. 29, 2012.
International Preliminary Report on Patentability for Application US2010/050339 dated Mar. 5, 2013.
Patent Cooperation Treaty International Search Report for Application US2011/48686 mailed Apr. 9, 2012.
International Preliminary Report on Patentability for Application US2011/48686 dated Feb. 28, 2013.
Patent Cooperation Treaty International Search Report for Application US2012/42329 mailed Feb. 22, 2013.
Supplementary Search Report mailed Jan. 21, 2009 for European Patent Application EP05736275.
Examination Report for EP 05736275.8 mailed May 15, 2009.
1982 Issue Rolling Stones Magazine, Film Rentals by Vending Machine.
1984 Picture of U.S. Installation of Japanese Manufactured VHS Rental Kiosk.
"Canadian Office Action for Canadian Patent Application No. 2604730, mailed on Aug. 27, 2015.".
"European Search Report for Application No. EP1280399, mailed on Aug. 19, 2015, 8 pages.".
International Search Report and Written Opinion for Application No. PCT/US2011/048686, mailed on Apr. 9, 2012, 9 pages.
Supplemental European Search Report for Application No. EP11820476 mailed on Jun. 22, 2015, 2 pages.

* cited by examiner

SECONDARY MEDIA RETURN SYSTEM AND METHOD

TECHNICAL FIELD

The present invention relates to improvements in article dispensing systems and components and methods related to same. More particularly, the present invention relates to an article dispensing machine including a rapid article return system and method of using same.

BACKGROUND OF THE INVENTION

While the present invention is often described herein with reference to a digital video disc distribution system, an application to which the present invention is advantageously suited, it will be readily apparent that the present invention is not limited to that application and can be employed in article dispensing systems used to distribute a wide variety of dispensable articles.

Conventional stand-alone vending machines are configured to support the dispensing and return of articles by a user or customer without a need for employee assistance or intervention during the rental and return processes. Such dispensing machines typically store such vendible or rentable articles in discrete, identifiable locations. A selection process enables the user to select among a vend mode, a rent mode, and a return mode, and an article selection enables the user to select a desired videocassette to be vended or rented. These conventional dispensing machines include a user-friendly control interface resembling the interface conventionally used in association with an automated teller machine. The dispensing machines also preferably have a main graphical user interface with touch screen interface control capability and an article return slot for returning rented articles. In the return mode, typical article return routines through the article return slot are initiated through the main graphical user interface and/or through the swiping of a credit card used for the initial rental process of the media article being returned.

Some dispensing machines do incorporate additional user interface portions having additional or even identical user interface components. For example, these user interface components could be incorporated on other panels of the housing of machine so that the machines can be used simultaneously by multiple consumers.

However, to simultaneously accommodate multiple consumers the additional user interface portions require duplicated interface screens, duplicated credit card readers as well as duplicated article distributing openings or slots, which raises production cost of these machines to prohibitive levels. Full additional article dispensing machines utilized for higher traffic locations are clearly more costly and take up additional floor space where article dispending machine are located. As such, the DVD rental industry is in need of less costly article dispensing machines that accommodate multiple customers without duplicating all components of user interface portions while providing a more efficient return process of rented articles in high traffic areas.

SUMMARY OF THE INVENTION

The present invention is defined by the appended claims. This description summarizes some aspects of the present embodiments and should not be used to limit the claims.

The foregoing problems are solved and a technical advance is achieved by the use of article dispensing machines which include an additional user interface and a single rent/return assembly in communication with both user interfaces.

One embodiment is directed to a method for facilitating a return of a media article to an article dispensing machine. The method includes receiving from a first user interface a first request to return the media article to the article dispensing machine, wherein the article dispensing machine comprises a first user interface portion having the first user interface, a second user interface portion having a second user interface, and an article transfer portion configured to enable distribution of vended media articles and receipt of returned media articles through an opening of the article dispensing machine, determining whether the article transfer portion is available to enable the return of the vendible media article through the opening. Based on the availability determination of the article transfer portion, the method further includes displaying through a first user interface screen associated with the first user interface portion information indicating whether to proceed with the return of the vendible media article or to wait for a notification to proceed with the return, wherein the displayed information to wait for the notification is generated when a second request to vend or return another media article through the opening is received from the second user interface prior to the receipt of the first request.

Another embodiment is directed to an article dispensing machine which includes a housing having a first user interface portion, a second user interface portion, and an article transfer portion in communication with first and second user interface portions. The first user interface portion has a first display monitor and a button, the second user interface portion has a second display monitor and a card reader, and the article transfer portion has an opening to permit distribution of requested media articles initiated through the second user interface portion and receipt of returned articles initiated through the first and second user interface portions.

BRIEF DESCRIPTION OF THE DRAWINGS

FIGS. 4 C-D illustrate a top view and a perspective view, respectively, of an embodiment of an article return slot of the article dispensing machined during the process of returning a media article;

DETAILED DESCRIPTION

Figure 1:
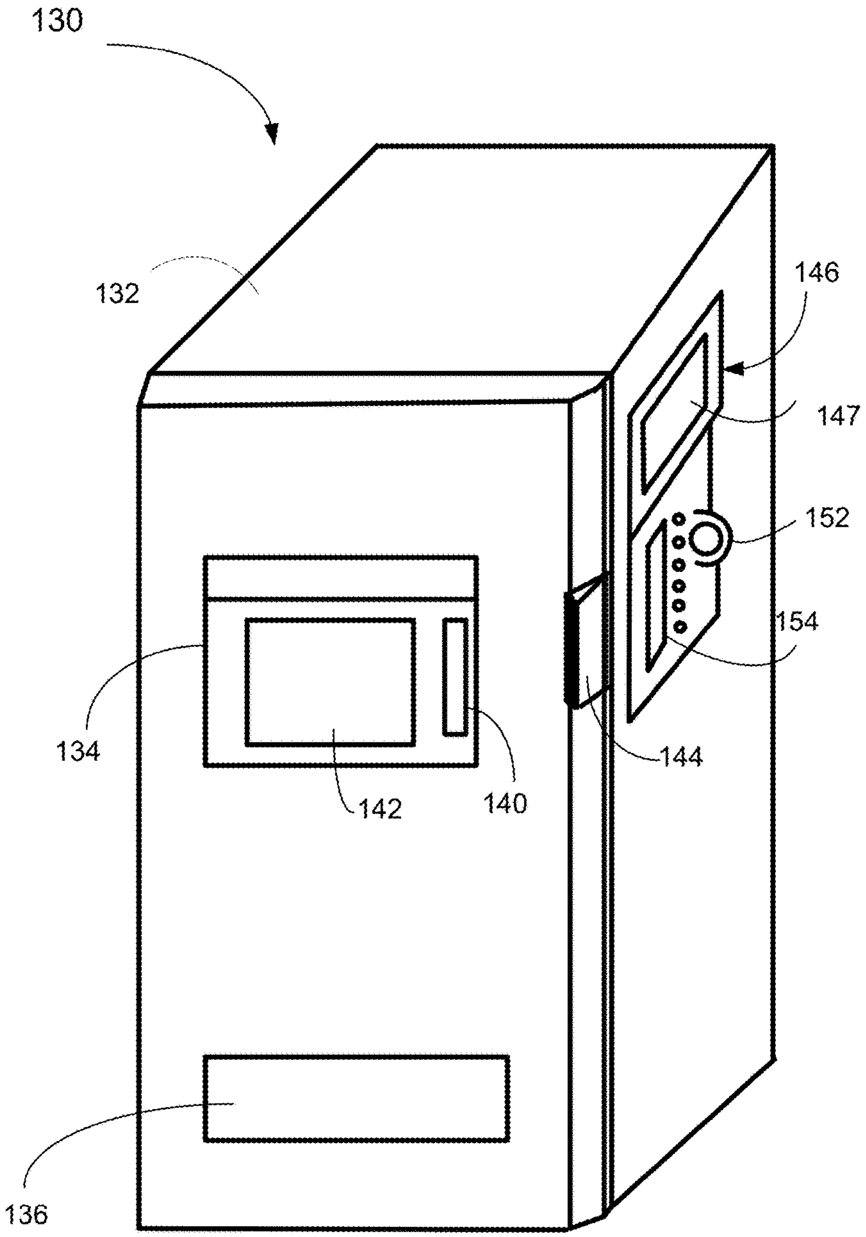
FIG. 1 is a perspective view of an embodiment of an article dispensing machine including a rapid return terminal module in accordance with the principles of the present invention.

The present invention is defined by the appended claims. This description summarizes some aspects of the present embodiments and should not be used to limit the claims.

While the present invention may be embodied in various forms, there is shown in the drawings and will hereinafter be described some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects.

FIG. 1 illustrates an article dispensing machine generally designated 130. Article dispensing machine 130 is one of a plurality of article dispensing machines included within an article distribution system having a plurality of such machines situated at a plurality of hosting locations. The article dispensing machines of a particular article distribution system preferably form a network. As such, those machines are preferably in electrical and/or wireless communication with each other and with a central office from which inventory decisions can be made.

In a preferred application, article dispensing machine 130 is a DVD dispensing machine that can be utilized by consumers to purchase and/or rent movie videos and/or video games embodied on DVD discs. Nonetheless, those skilled in the art will appreciate that article dispensing machine 130 is not limited to the application of DVD distribution, but rather will have applicability for use in the distribution of a variety of articles.

Dispensing machine 130 further includes a user interface portion 134 and an article transport storage unit transfer opening 136 with an associated door designed to receive an article transport storage unit 1 (not shown), as desired. The user interface portion of housing 132 can include a touch activated display monitor or screen 142 for input of commands, a card reader 140 and an article transfer opening 144. The article transfer opening 144 permits distribution of requested articles through the opening and receipt of returned articles through the opening.

The card reader 140 (details not shown) is preferably designed in known fashion to read magnetically encoded membership and/or credit cards for authorizing the distribution of articles of inventory through the article transfer opening 144. The touch screen 142 permits consumers and/or inventory stocking personnel to communicate with the dispensing machine 130 and/or a central office linked in electrical/wireless communication with the dispensing machine. Touch screen 142 also permits consumers and/or inventory stocking personnel to enter appropriate commands directed to carrying out specific machine tasks.

In particular, the display monitor of the dispensing machine 130 preferably incorporates known touch screen technology. As such, it provides for a user interface presenting visual display of pertinent information during the servicing and distribution processes of machine 230 and operates as a user interface for entry of commands designed to carry out machine tasks.

The dispensing machine 130 may include an additional display monitor (not shown), which can incorporate known plasma or LCD video technology and provides for display of trailers, advertisements and other desired point-of-purchase video effects.

Housing 132 is preferably a combination molded fiberglass and sheet metal cabinet. However, those skilled in the art will appreciate that the housing can be constructed from a variety of other suitable materials and with a variety of other suitable manufacturing techniques. In the article dispensing machine embodiment illustrated in FIG. 1, article dispensing machine 130 preferably has a total height of eighty-one inches, a total width of fifty-seven inches, and a total depth of forty-six inches. Assuming the construction described above with reference to this illustrated embodiment of the article dispensing machine, machine 130 and article transport storage unit 138 (when empty) preferably have an approximate combined weight of six hundred sixty pounds. As illustrated, housing 132 preferably includes a door panel (not shown) that can be opened for repair of components included within machine 130.

Furthermore, in accordance with one embodiment of the present article dispensing machine 130, the machine 130 incorporates an additional user interface 146, having additional user interface components. User interface 146 is shown incorporated on a side panel of housing 132 so that machine 130 can be used simultaneously by multiple consumers, translating into more efficient exchange of media articles between users and machine 130 of media articles in high traffic areas, and the reduction of a need for additional article dispensing machines. Alternately, user interface 146 could be incorporated on any other location of housing 132. Additional details about and method of use of user interface 146 will be discussed hereafter following discussions of other elements of article dispensing machine 130.

Figure 2:
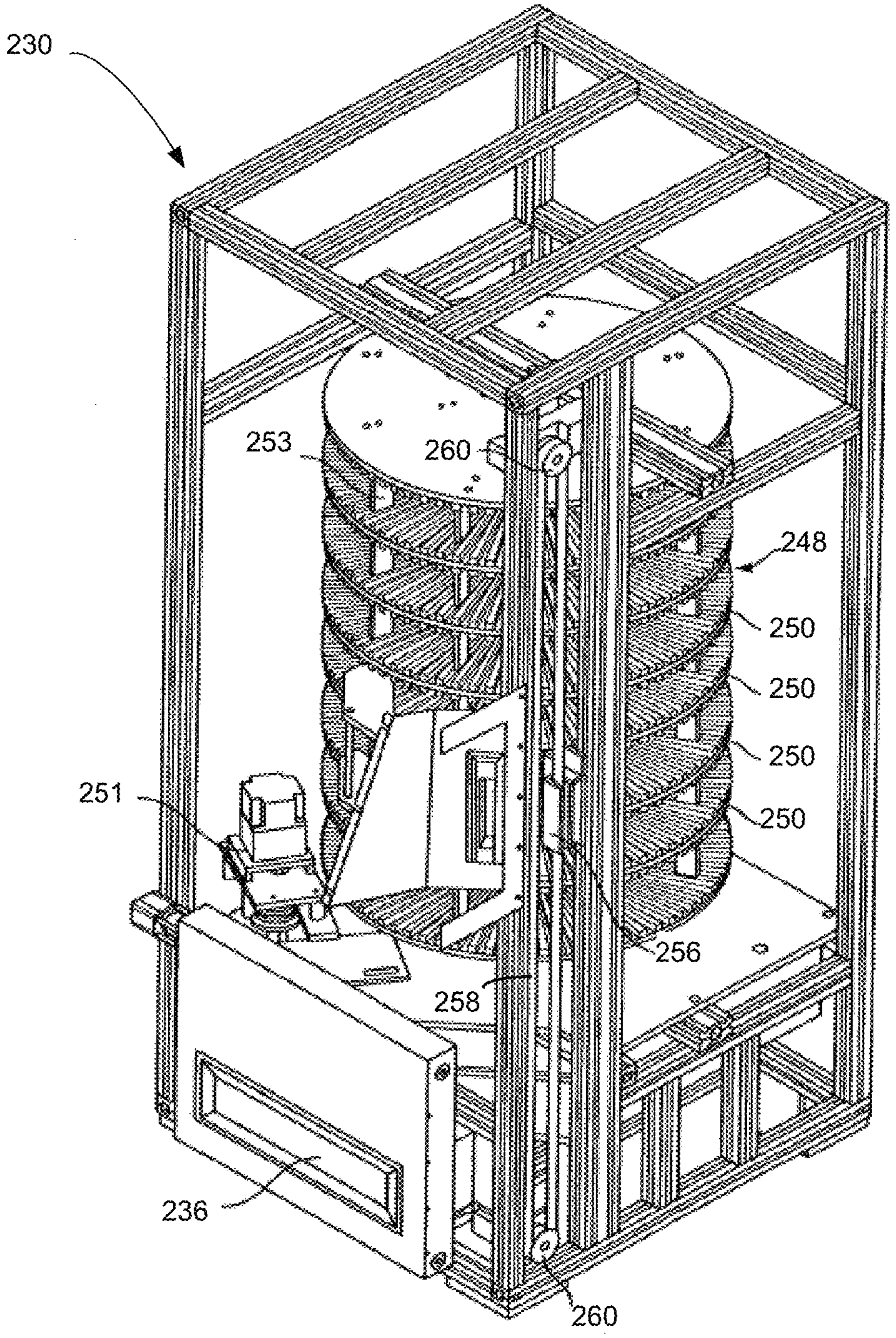
FIG. 2 is a partially open perspective view of the article dispensing machine of FIG. 1.

Referring now to FIG. 2, components positioned in the interior of dispensing machine 130 are illustrated. Machine 130, 230 includes a storage rack unit 248 having a plurality of circular-shaped storage racks 250 sharing a common central axis. A motor 251 is configured to drive a shaft (not shown), which is positioned along the common central axis of storage rack unit 248 to provide for rotation of the storage racks 250, as desired. Wheels (not shown) are included to receive a belt used to rotate the wheels and, in turn, rotate the shaft.

Each storage rack 250 includes radially extending, angularly separated compartment panels defining article receiving compartments designed to receive and retain flat-type pack articles, such as DVD cases, as desired. The compartment panels are preferably axially aligned to retain the opposing sides of DVD cases at the top and bottom ends thereof. In that regard, the DVD cases are preferably retained between successive vertical pairs of storage racks 250. The storage racks 250 are vertically spaced by axially extending support members 253.

The dispensing machine includes a robotic arm 256 that is connected to a conveying belt 258 carried by rollers 260. At least one of the rollers 260 is driven by a motor to provide for movement of robotic arm 256.

Now referring to FIGS. 4 A-D, elevational, top, side, and perspective views of user interface, bezel unit or return terminal module 446 are illustrated in accordance with the present invention. With the incorporation of return terminal module 446, article dispensing machine 130, 230 allows an additional customer or user to interact with article dispensing machine 130, 230 to return a media article via return terminal module 446 while its hardware is idle during a browsing period on main user interface 134 conducted by the first user.

Figure 4B:
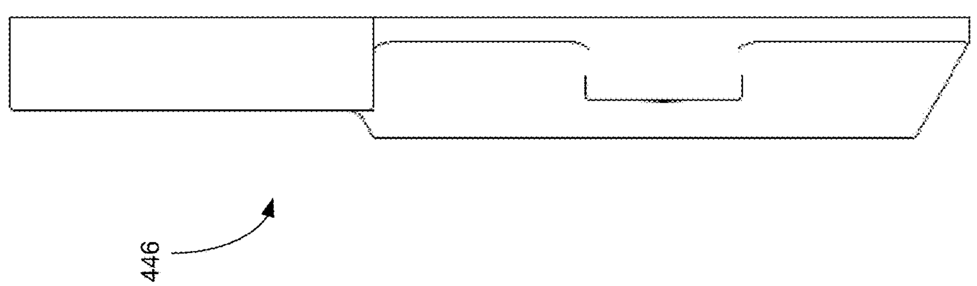
FIGS. 4 A-B illustrate cross-sectional views of an embodiment of an article return slot of the article dispensing machined during the process of returning a media article.
Figure 4A:
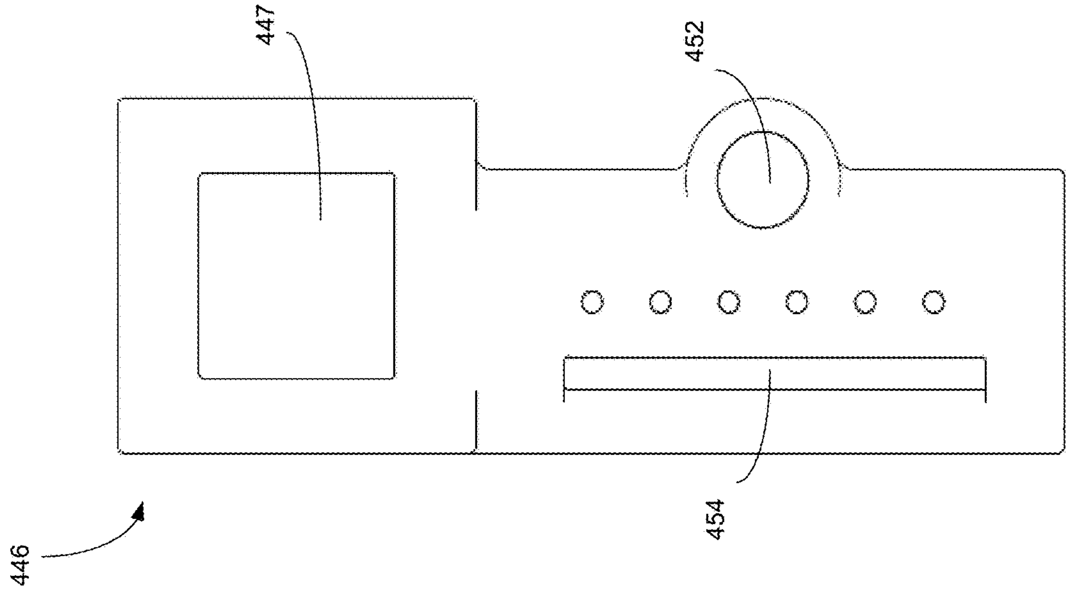
Figure 4D:
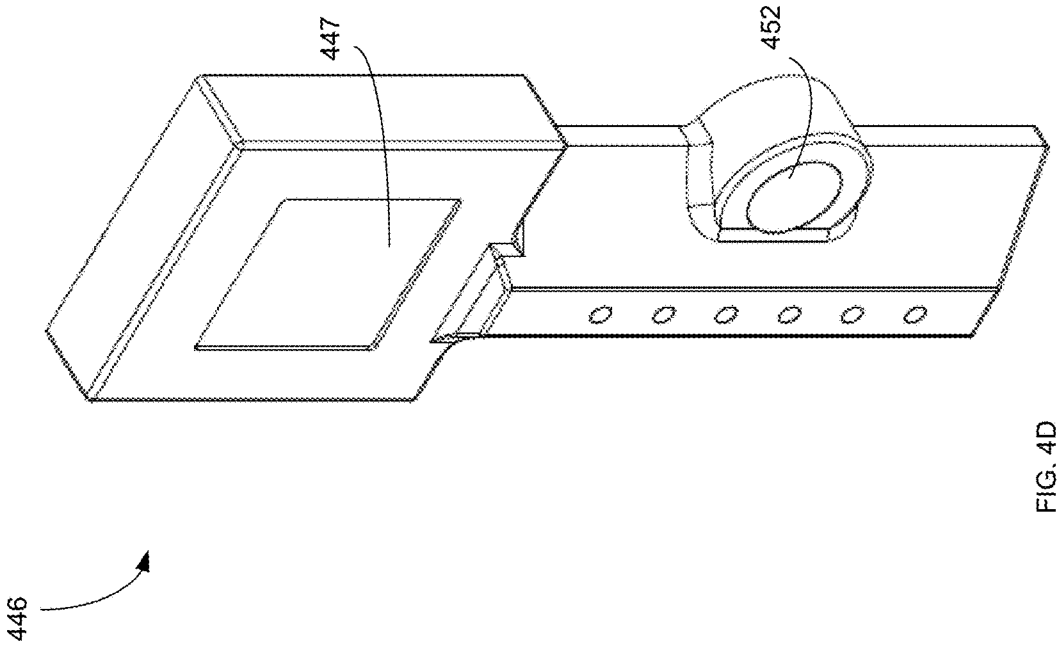
Figure 4C:
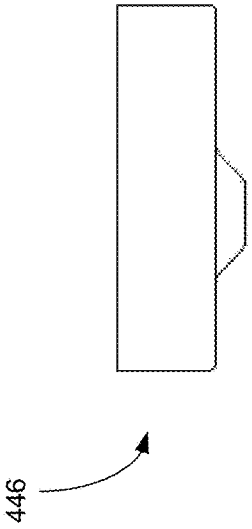

As shown in FIG. 1 and FIGS. 4A and 4D, return terminal module 146, 446 includes a display monitor and touch screen 147, 447, an article return opening or return slot 154, 454, and a return button 152, 452. Display monitor 447 permits consumers and/or inventory stocking personnel to communicate with dispensing machine 130 and/or a central office linked in electrical communication with dispensing machine 130. Display monitor 447 also permits consumers and/or inventory stocking personnel to enter appropriate commands directed to carrying out specific machine tasks. Display monitor 447 preferably incorporates known plasma or LCD video technology and known display monitor technology. When pressed by a user, return button 452 is configured to communicate a signal to a processor (not shown) indicating a desire of the user to return a previously rented article, which might have been dispensed by article dispensing machine 130 or by any other dispensing machines that is part of the network of article dispensing machine 130.

Figure 3:
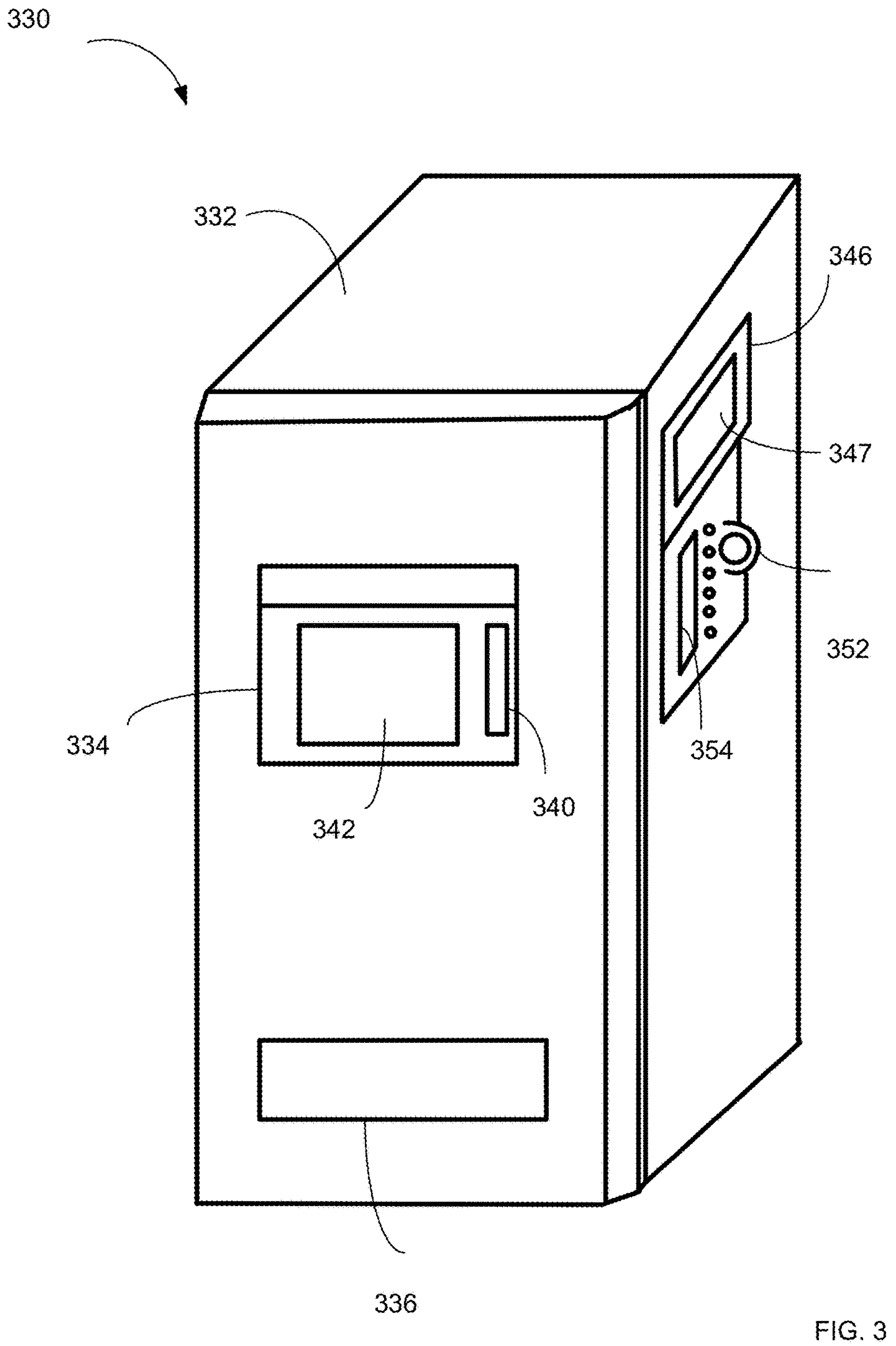
FIG. 3 is a perspective view of another embodiment of an article dispensing machine including a rapid return terminal module in accordance with the principles of the present invention.

Alternatively, as shown in FIG. 3, article return opening or return slot 354 can also be configured to dispense media articles out of article dispensing machine 330. With such configuration of rent/return opening 154, 354, 454, article dispensing machine 330 can be manufactured without article transfer opening 144. As such, article dispensing machine 330 accommodates simultaneous interactions with two users through main user interface 134, 334 and additional return interface 146, 346, 446 and only one article rent/return opening 154, 354, and 454. With this configuration of article dispensing machine 130, the additional customer or user can interact with article dispensing machine 330 to return a media article via return terminal module 346, 446 while its dispensing/returning hardware is idle during a browsing period on main user interface 134 conducted by the first user.

Now referring to FIGS. 5 A-B, cross-sectional views of a receiving mechanism or assembly 500 of article return slot 154 illustrate stages of a process of returning the media article to article dispensing machine 130. Although shown built into a side panel of article dispensing machine 130, article return slot 154 can be built into a side panel or wall of any machine/container or sealed area within which deposited media articles are to be deposited and stored. As shown, receiving mechanism 500 is comprised of an upper lip 502 and a lower lip 504, which are set apart to form an article opening 506 into which an article 508, such as a DVD, may be inserted. Within article opening 506 is located a flap 510 held in a biased position against an internal or inner wall 512 of lower lip 504 by a spring 514. Alternately, flap 510 could be held in any other distant position from lower lip 504 so long as it blocks article opening 506. Moreover, spring 514 could be any other mechanism that keeps flap 510 in a closed position when no external force is applied to push it away from lower lip 504. Behind flap 510 is provided a wall or barrier 516 movable by a rotating gear 518 connected to a motor (not shown), and beyond movable barrier 516 is an internal storage area (not shown) which includes article storage unit 138. Rotating gear 518 is configured to rotate about an axis that is perpendicular to the movement of barrier 516. Of course, other suitable mechanisms can be used to move the barrier 516 back and forth.

Flap 510 comprises a light source 520 emitting a signaling light at a specific point along its length and directed towards inner wall 512. Inner wall 512 of lower lip 504 comprises a light sensor 522, which is capable of detecting the light emitted by light source 520 when light sensor 522 and light source 520 are in alignment. Light sensor 522 is electrically connected to the aforementioned motor. Although shown in a vertical orientation such that article 508 is inserted substantially parallel to the ground, assembly 500 could be rotated so as to receive article 508 substantially perpendicular to the ground. In such a case, upper and lower lips 502 and 504 become left and right lips, flap 510 would move in a horizontal fashion with respect to inner wall 512 of lip 504 and barrier 516 would close from one horizontal side to another horizontal side rather than from bottom to top, and vice-versa. It will be understood, that other orientations of assembly 500 could also be employed.

Figure 5A:
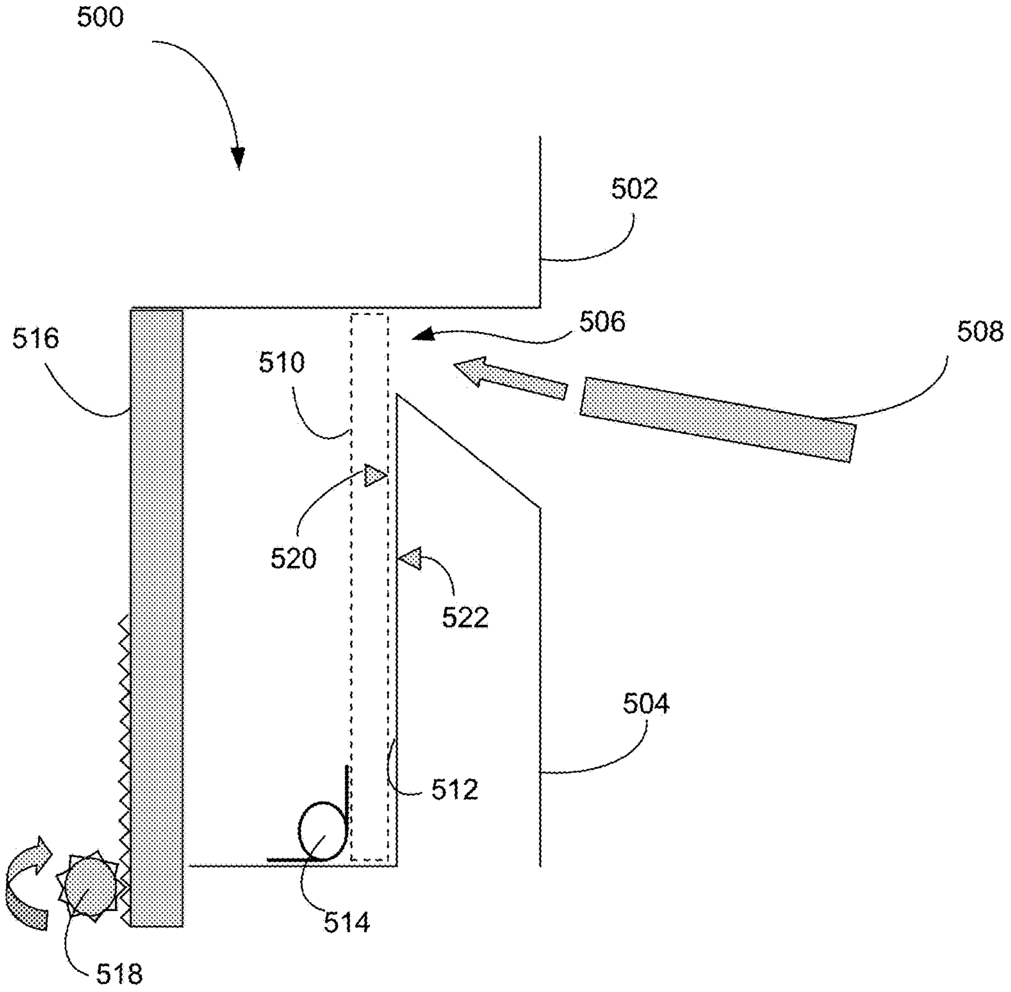
FIG. 5 is a schematic block diagram illustrating an embodiment of a circuitry of the article dispensing machine and its connections to a main user interface and to the rapid return terminal module of the article dispensing machine of FIG. 1.
Figure 5B:
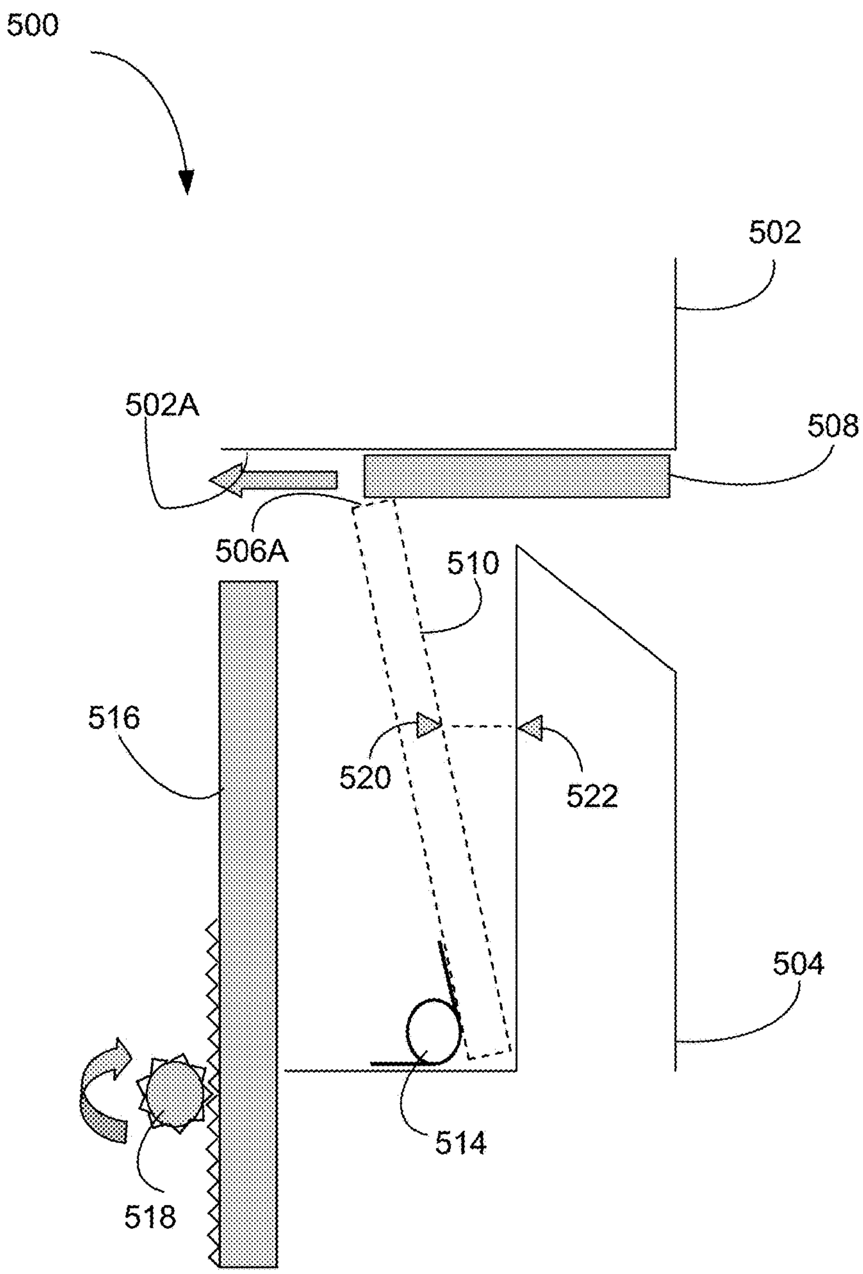

To illustrate the functioning of assembly 500, FIG. 5A shows assembly 500 in a stand-by closed position and FIG. 5B illustrates assembly 500 in an operating position indicative of when a media article 508 in a standard-sized case is inserted for receipt internally to article dispensing machine 130 and for storage by article storage unit 138. As shown in FIG. 5A, movable barrier 516 is initially in a closed position, preventing passage of any items into the internal storage compartment of article dispensing machine 130. Additionally, spring 514 is configured to hold flap 510 in a closed position, blocking off article opening 506. As an object, such as article 508, is inserted into article opening 506 with sufficient force to overcome a biasing force of spring 514, flap 510 rotates rearward toward movable barrier 516. The rearward movement of flap 510 forms a gap 506A between a top end 510*a* of flap 510 and a lower surface 502A of upper lip 502, allowing an object or article having a desirable thickness to pass toward movable barrier 516. As flap 510 rotates rearward, the signaling light emitted by light source 520 is detected by light sensor 522, i.e., light source 520 and light sensor come into alignment with one another. If the emitted light is detected by light sensor 522 for a predetermined period of time, approximately three (3) seconds for example, i.e., light source 520 and light sensor 522 stay in alignment for approximately 3 seconds, light sensor 522 communicates a signal to the motor via a controller (not shown), which will cause the motor to move barrier 516 via gear 518 into an open position and allow full insertion of article 508.

Receiving assembly 500 is configured such that light source 520 and light sensor 522 remain in alignment only when flap 510 is rotated rearward to a point corresponding with the insertion of article 508 having a desired thickness, such as that of a standard DVD case. If article 508 has thinner thickness than the desired thickness, i.e., has insufficient thickness, is inserted, flap 510 will not rotate far enough to align emitting light source 520 with light sensor 522, and barrier 516 remain closed. If an article having a thicker thickness than the desired thickness is inserted, emitting light source 520 and light sensor 522 will only align for an instant that is shorter than approximately three seconds, as flap 510 rotates beyond the point of alignment. This will not cause barrier 516 to open because the alignment must last for approximately three seconds to trigger the motor. Thus, assembly 500 functions to prevent receipt of articles having thicknesses less than or greater than a desired thickness, e.g. less than or greater than that of a standard DVD case. It will be understood, however, that other systems configured to detect the proper thickness of returned articles to trigger their acceptance into assembly 500 could be employed without deviating from the principles of the present invention.

Figure 6:
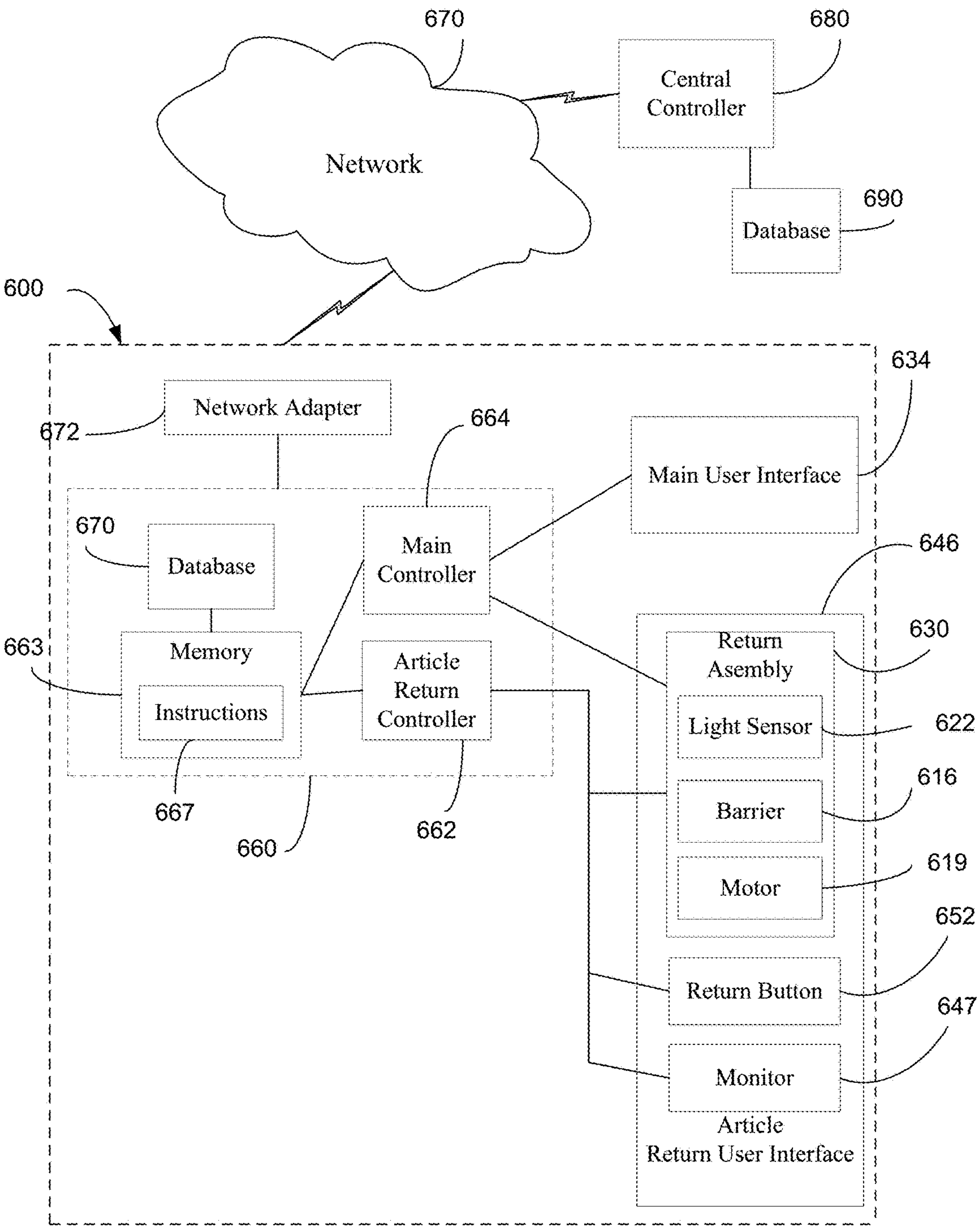
FIG. 6 is a flow chart illustrating a method for returning a media article to the article dispensing machine by utilizing the return terminal illustrated in FIGS. 4 A-D.
Figure 7:
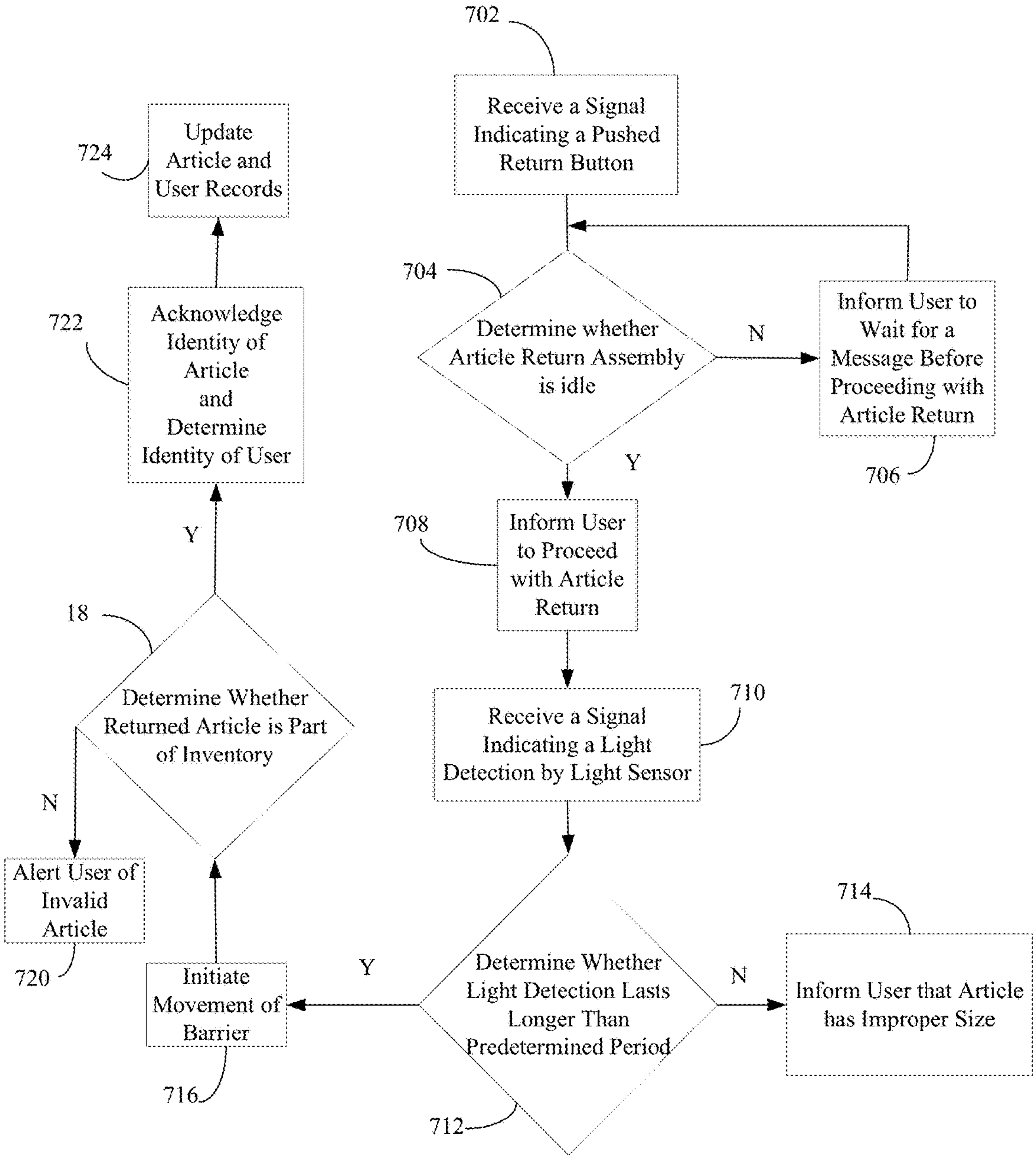
FIG. 7 is a flow chart of one embodiment of the invention.

Referring now to FIG. 6, a block diagram illustrating an embodiment of a circuitry 600 of article dispensing machine 130 in accordance with the principles of the present invention is shown. Machine circuitry 600 includes a processing module 660 which includes an article return processing controller or processor 662 for controlling return terminal module 146, 346, 546, a main vending controller or processor 664 for controlling user interface 134, 534, a memory 663 which includes an instructions module 667, and a database 669 for storing article data and user's records. Processing module 660 is connected to a communication network 670 through a network adapter 672. Return controller 662 may also be coupled to main user interface controller 664 via a messaging bus (not shown).

Network 670, which is connected to a central controller or server 680, can be a global network or a wide area network (WAN), a local area network (LAN), and connected to public switched telephone network (PSTN) (not shown), which can include one of more landline networks and wireless data networks, such as cellular networks, WiFi networks, Bluetooth networks, etc. . . . . Network 670 and the PSTN pertain to some portions of the World Wide Web (WWW, hereafter referred to as Web) and the Internet. Central controller 680 is preferably located remotely from article dispensing machine 130. It will be understood that as used herein, the terms "controller" includes or refers to a microprocessor operating computer software that is configured to perform the software tasks described herein. As stated above, article dispensing machine 130 is electronically controlled, and is equipped for that purpose with electronic circuitry 600 including vending controller 664 and return controller 662. Vending controller 664 is responsible for generating user interfaces displayed on display screen or monitor 142, processing commands received from user interfaces, displaying information to a user, communicating with the vending network, and dispensing articles. Return controller 662 is responsible for generating user interfaces displayed on display screen or monitor 147, 547, processing commands received from user interfaces, displaying information to a user, and managing the return of rented articles.

Generally, in terms of hardware architecture processing module 660 can further include one or more input and/or output (I/O) devices (or peripherals) that are communicatively coupled via a local interface. The local interface can be, for example, but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the other computer components.

Processor/controller is a hardware device for executing software, particularly software stored in memory. Processor can be any custom made or commercially available processor, a central processing unit (CPU), a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80x86 or Pentium series microprocessor from Intel Corporation, a PowerPC microprocessor from IBM, a Sparc microprocessor from Sun Microsystems, Inc., or a 68xxx series microprocessor from Motorola Corporation. Processor may also represent a distributed processing architecture such as, but not limited to, SQL, Smalltalk, APL, KLisp, Snobol, Developer 200, MUMPS/Magic.

Memory can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory may incorporate electronic, magnetic, optical, and/or other types of storage media. Memory can have a distributed architecture where various components are situated remote from one another, but are still accessed by processor.

The software in memory may include one or more separate programs. The separate programs comprise ordered listings of executable instructions for implementing logical functions. The software in memory includes a suitable operating system (O/S). A non-exhaustive list of examples of suitable commercially available operating systems is as follows: (a) a Windows operating system available from Microsoft Corporation; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). Operating system essentially controls the execution of other computer programs and provides scheduling, input-output control, file and data management, memory management, and communication control and related services.

The software in the memory may further include a basic input output system (BIOS). The BIOS is a set of essential software routines that initialize and test hardware at startup, start the O/S, and support the transfer of data among the hardware devices. The BIOS is stored in ROM so that the BIOS can be executed when article dispensing machine 130 is activated. When article dispensing machine 130 is in operation, processor is configured to execute software stored within memory, to communicate data to and from memory, and to generally control operations of article dispensing machine 130 pursuant to the software. The present invention and the O/S, in whole or in part, but typically the latter, are read by processor, perhaps buffered within the processor, and then executed.

Steps and/or elements, and/or portions thereof of the present invention may be implemented using a source program, executable program (object code), script, or any other entity comprising a set of instructions to be performed. When a source program, the program needs to be translated via a compiler, assembler, interpreter, or the like, which may or may not be included within the memory, so as to operate properly in connection with the O/S. Furthermore, the software embodying the present invention can be written as (a) an object oriented programming language, which has classes of data and methods, or (b) a procedural programming language, which has routines, subroutines, and/or functions, for example but not limited to, C, C++, Pascal, Basic, Fortran, Cobol, Perl, Java, and Ada.

The I/O devices may include input devices, for example but not limited to, input modules for PLCs, a keyboard, mouse, scanner, microphone, touch screens, interfaces for various medical devices, bar code readers, stylus, laser readers, radio-frequency device readers, etc. Furthermore, the I/O devices may also include output devices, for example but not limited to, output modules for PLCs, a printer, bar code printers, displays, etc. Finally, the I/O devices may further include devices that communicate both inputs and outputs, for instance but not limited to, a modulator/demodulator (modem; for accessing another device, system, or network), a radio frequency (RF) or other transceiver, a telephonic interface, a bridge, and a router.

When the present invention is at least in part implemented in software, it should be noted that the software can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The present invention can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

For that purpose, article dispensing machine 130 is equipped with network communication equipment and circuitry. In a preferred embodiment, the network communication equipment includes a network card such as an Ethernet card. In a preferred network environment, article dispensing machine 130 is configured to use the TCP/IP protocol to communicate via network 670. It will be understood, however, that a variety of network protocols could also be employed, such as IPX/SPX, Netware, PPP and others. It will also be understood that while a preferred embodiment of the present invention is for article dispensing machine 130 to have a "broadband" connection to the network 101, the principles of the present invention are also practicable with a dialup connection using a standard modem. Wireless network connections are also contemplated, such as wireless Ethernet, satellite, infrared and radio frequency networks.

Vending controller 664 is configured to transmit information to and receive information from network 670. While the Internet is the preferred network method for interconnecting network 670 and article dispensing machine 130, it will also be understood that a private or closed network is also practicable herewith. Network 670 is preferably the Internet, but may be any network for placing article dispensing machine 130 in communication with central controller 680. Network 670 serves to communicate information regarding vending transactions, and is also therefore referred to herein as a "transaction network," though as used herein, the terms "network" and "transaction network" are synonymous.

Central controller 680 is responsible for communicating with the vending controller 664 via network 670. Central controller 680 receives communication from article dispensing machine 130, and also transmits information to dispensing machine 130. For example, when a DVD rental transaction is performed at article dispensing machine 130, transaction data such as the rented DVD title is then transmitted from dispensing machine 130 to central controller 680 via network 670. It will be understood that servers in general, such as central controller 680, are often distributed.

Central controller 680 is in communication with a central database 690. Database 690 stores information regarding the transaction network. For example, database 690 stores data regarding the vending inventory of article dispensing machine 130. Database 690 also stores sales information regarding the sales quantities of the vending merchandise stored in machine 690. For example, database 690 stores information regarding the sales totals for each DVD title. Database 690 also stores user information and rental transaction information, such as user IDs, PINs, the date on which DVDs are due to be returned and the date on which DVDs were rented.

Database 690 is preferably a relational database, although other types of database architectures may be used without departing from the principles of the present invention. For example, database 690 may be a SQL database, an Access database or an Oracle database, and in any such embodiment have the functionality stored herein. Database 690 is also preferably capable of being shared, as illustrated, between a plurality of central controllers 680 and its information is also preferably capable of being transmitted via network 690. It will be understood that a variety of methods exist for serving the information stored in database 690, such as ODBC, MySQL and CFML.

Central controller 680 and database 690 are also preferably accessible by personal computers (not shown). In a preferred embodiment, a financial server (not shown) can also be in communication with network 670. It will be understood that a variety of financial services exist for processing financial information via the Internet and other networks 670. Those services allow for the processing of credit card and debit card information, so that users of the services do not have to interface directly with credit and debit card companies. When a user interfaces with article dispensing machine 130 and provides financial information such as a credit card number, that information is transmitted from machine 130 via the network 670. In one embodiment, the financial information is transmitted directly from machine 130 to the financial server. In another embodiment, the information is transmitted to central controller 680 first, and is then transmitted to the financial server. In either of those embodiments, the financial server is responsible for processing the financial information received from the user at article dispensing machine 130. In another embodiment, the financial server software is comprised in central controller 680, and financial transactions are performed by central controller 680 without a separate financial server.

Now referring to FIGS. 3-7, as a customer or user, desiring to return media article 508, approaches article dispensing machine 130, the user notices that another user is utilizing article dispensing machine 130 via its main user interface 134. The user then can approach article dispensing machine 130 to initiate return of article 508 through return terminal module 446 and observes display monitor 147, 447 for commands and information from associated return controller 662, which monitors return terminal module 146, 446 and its components. To initiate a return of media article 508 to article dispensing machine 130, the user pushes or presses return button 452. Upon detection of a signal indicative of return button 452 having been pressed, at Step 702, return controller 662 determines whether return assembly 500 of article return module 154, 354, 554 is available or idle to perform the return of article 508 or is actively performing an article return initiated by the other user interacting with main user interface 134, 534, at Step 704. Upon determination that return assembly 500, 630, is not available to perform the return of article 508, return controller 662 generates an interface screen for display on monitor 147, 347, 547 to inform the user that the return of article 508 can not be performed presently or immediately but will alerted to reinitiate the return of media article 508 once the in-progress return process is completed, at Step 706. Return controller 662 continues to monitor the availability of return assembly 500, 630. Upon determination that return assembly 500, 630 is available, return controller 662 generates another interface screen to invite the user to proceed with the return of media article 508, at Step 708. Subsequently, the user can proceed to return media article 508 by sliding it between upper lip 502 and lower lip 504 through article opening 506 towards flap 510. Because flap 510 is held in a biased closed position against internal wall 512 of lower lip 504 via spring 514, the user needs to push back flap 510 toward an internal space of article dispensing machine 130 by applying a force that overcomes the biasing force of spring 514. As stated above, based on the thickness of the object being pushed against flap 510, light source 520 and light sensor 522, 622 may or may not come into alignment for a desirable duration or period of time indicating a proper thickness of the object. If the light emitted by light source 520 is detected by light sensor 522, 622, at Step 710, then controller 662 determines whether the detection lasts at least a predetermined period of time, about three seconds for example, at Step 712. If the detection fails to last at least the predetermined period, controller 662 generates an interface screen indicating to the user that he/she is attempting to return an improper article or the article is being returned in a case having an improper thickness, at Step 714. On the other hand, if at least the predetermined period is detected, then controller 662 generates a signal that triggers the aforementioned motor 619 to move barrier 516, 616 away from lower surface 502A of upper lip 502, at Step 716, to accommodate further the insertion of media article 508 through article opening 406 and therefore into a receiving internal area of article dispensing machine 130.

Preferably, media article 508 and/or its enclosing case are provided with an identification element (not shown), such a code printed on the enclosing case and readable by known technology or a radio frequency identification device (RFID) tag or transponder having an identifying signal that uniquely identifies the returned object. Return assembly 500, 630 preferably includes at least one article identification device (not shown) capable of reading, with a barcode reader for example, and/or detecting, with an RFID sensor for example, the identification element of media article 408 once inserted within return assembly 500, 630. If correctly identified to be an article associated with the media inventory associated with the machine network formed of article dispensing machines 130 and distributed by one of them, media article 508 is subsequently retrieved from return assembly 500, 630 and automatically restocked in article storage unit 238, at Step 718, for its next rental. However, if media article 508 is not recognized as one of the inventory articles, controller 662 generates a user interface screen alerting the user that media article 508 can't be recognized as an inventory article and triggers return assembly 500, 630 to return it to the user by ejecting out of article dispensing machine 130, at Step 720, or stores the unidentified or unrecognized article in a storage area or compartment of article dispensing machine 130 for unrecognized items. In this way, restocking personnel know which articles need to be checked quickly to determine, as accurately as possible, which articles have been returned on time, and which articles should be repaired, for example, by replacing a soiled bar code or a damaged RFID tag or transponder, before they are restocked. If identified as a rented inventory article, controller 662 communicates the read or detected identifying code to database 670 and/or database 690 to update article and inventory records, and requests or retrieves identification of the user who rented media article 508. Upon receipt of the user's identification, controller 662 initiates an update of the user's rental records and generates an interface screen to acknowledge the return of media article 508 and inform the user of the record update and any pertinent billing records associated with the rental of media article 508, at Step 724. Pertinent billing records may include additional charges if article 508 was returned after its return due date, assigned to it at rental time for example.

While certain embodiments of the present invention have been described, it will be appreciated that changes and modifications can be made and that other embodiments may be devised without departing from the true spirit and scope of the invention.

What is claimed is:

1. A method for facilitating a return of an article by a user to an article dispensing machine, comprising the steps of:

receiving from a first user interface a signal indicative of a first request to return the article to the article dispensing machine, wherein the article dispensing machine comprises a first user interface portion having the first user interface, a second user interface portion having a second user interface, and at least one article transfer portion configured to enable distribution of vended articles and receipt of returned articles through an port opening of the article dispensing machine wherein the article dispensing machine includes fewer article transfer portions port openings than user interfaces;

determining whether the article transfer portion is available to enable the return of the article through the opening; and based on the availability determination of the article transfer portion, displaying through a first user interface screen associated with the first user interface portion information indicating to the user whether to proceed with the return of the vendible article or to wait for a notification to proceed with the return, wherein the displayed information to wait for the notification is generated upon determination that the article transfer portion is processing a second request to vend or return another article through the port opening received from the second user interface portion prior to the receipt of the first request wherein the article is unidentified before it is received into the dispensing machine.

2. The method of claim 1, wherein the first user interface is an actuable button.

3. The method of claim 1, wherein the first user interface portion is controlled by first controller and the second user interface portion is controlled by a second controller.

4. The method of claim 3, wherein the first controller and the second controller monitor the return of media articles initiated by the first and second user interface portions.

5. The method of claim 1, further comprising:

receiving another signal indicative of a detection of a light lasting longer than a predetermined period of time.

6. The method of claim 5, further comprising:

triggering an unblocking of the opening to permit insertion of the article.

7. The method of claim 1, further comprising:

identifying the returned article once received through the opening.

8. The method of claim 7, further comprising:

updating a data record indicating that the identified article has been returned.

9. A system for facilitating a rapid return of an article to an article dispensing machine, comprising:

a first user interface for receiving a first user input command to return the article;

a first controller for determining whether an article return assembly is available for processing the first user input command;

a first user interface screen for informing the first user whether to proceed with the article return or to wait for a notification before proceeding with the return wherein the article is unidentified before it is received into the dispensing machine;

a second user interface screen presenting the notification to the user upon determination by the first controller that the article return assembly is available;

a second user interface for receiving a second user input command to vend or return another article;

a second controller for processing a signal indicative of the second user input command received by the second user interface prior to the receipt of the first user input command by the first user interface; and at least one article transfer portion configured to enable distribution of vended articles and receipt of returned articles through an port opening of the article dispensing machine wherein the system includes fewer article transfer portions port openings than user interfaces.

10. The system of claim 9, wherein the first user input command is an actuation of a button associated with a first user interface portion.

* * * * *